United States Patent [19]

Keiner et al.

[11] 4,113,896
[45] Sep. 12, 1978

[54] METHOD OF MANUFACTURING AN ELECTRICALLY CONDUCTIVE CONTACT LAYER

[75] Inventors: Hildegard Keiner, Ay, Iller; Emil Schmid, Oberelchingen; Walter Richly, Ulm-Wiblingen, all of Germany

[73] Assignee: Licentia Patent-Verwaltungs-G.m.b.H., Frankfurt am Main, Germany

[21] Appl. No.: 742,688

[22] Filed: Nov. 17, 1976

[30] Foreign Application Priority Data

Nov. 21, 1975 [DE] Fed. Rep. of Germany ....... 2552181

[51] Int. Cl.$^2$ ............................................. H01J 61/36
[52] U.S. Cl. .................................... 427/108; 427/125; 313/182; 313/220; 313/221
[58] Field of Search .................... 427/125, 67, 108; 313/220, 218, 221, 182; 106/47 R, 1

[56] References Cited

U.S. PATENT DOCUMENTS

| 2,564,706 | 8/1951 | Mochel | 427/126 X |
| 3,256,455 | 6/1966 | Saldi | 427/125 |
| 3,307,134 | 2/1967 | Griest | 427/125 X |
| 3,716,742 | 2/1977 | Nakayama | 313/182 |

FOREIGN PATENT DOCUMENTS 625,466  6/1949  United Kingdom ................. 106/47 R Primary Examiner—Ralph S. Kendall
Attorney, Agent, or Firm—Spencer & Kaye

[57] ABSTRACT

A method of manufacturing an electrically conductive contact layer comprises producing a paste like mixture of between 60 and 98% by weight of silver or silver oxide powder and between 2 and 40% by weight of glass powder with a vaporizable liquid, the mixture being applied to a surface on which the layer is to be formed and dried and baked in using air at 350° to 550° C.

14 Claims, 2 Drawing Figures

METHOD OF MANUFACTURING AN ELECTRICALLY CONDUCTIVE CONTACT LAYER

BACKGROUND OF THE INVENTION

The present invention relates to a method of manufacturing an electrically conductive contact layer and in particular a layer which adheres in an airtight manner both to the surface of a carrier of insulating material, such as glass, quartz or ceramics, and also to electrically conductive coatings on the insulating carrier. Gas discharge display devices for indicating numbers and symbols are known in flat constructions. They comprise two surface carriers made from insulating material which lie opposite one another at a small spacing, of which at least one carrier comprises glass. On the inner surfaces of these substrates facing one another are arranged electrodes which comprise electrically conductive coatings, particularly coatings made of tin oxide. The oxide (stannous or stannic oxide) coatings are used at least on the substrates because of their transparency which makes optical visibility possible. The two substrates are kept at the desired spacing by means of spacing members and are connected together in an airtight manner at the periphery. Inside there is a gas atmosphere. When applying a voltage to opposite electrodes a blue glow discharge, used for indication, occurs at the cathode. The cathode electrodes on one substrate are arranged as necessary to enable numerical, alpha numeric, cross or point raster representation are possible using them. In order to be able to apply the required voltages to the electrodes, airtight ducts are necessary. These ducts have already been proposed in great numbers. Ducts are even known in the form of electrically conductive coatings.

SUMMARY OF THE INVENTION

It is an object of the present invention to provide a new type of method for manufacturing contact layers which have a good airtight adherence (adhesion) both to electrically conductive coatings as well as to substrates made of glass or ceramics.

According to a first aspect of the invention, there is provided a method of manufacturing an electrically conductive contact layer comprising producing a paste like mixture of between 60 and 98% by weight of silver or silver oxide, between 2 and 40% by weight of glass powder and a vaporizable liquid agent, applying the paste to a surface on which the layer is to be formed, drying the paste and baking the paste in using air at 350° to 550° C.

Further according to this aspect of the invention, there is provided a method of manufacturing an electrically conductive contact layer which adheres in an air-tight manner both onto the surface of a carrier made of insulating material such as glass, quartz or ceramics and also onto electrically conductive coatings on the insulating carrier, by applying and heating a paste layer, characterized in that a mixture prepared in paste form with a vaporizable liquid and comprising 60 to 98% by weight silver or silver oxide powder and 2 to 40% glass powder is applied to the surface to be covered with the contact layer in layer form, is dried and is baked in by air at 350° to 550° C.

According to a second aspect of the invention, there is provided an electrically conductive contact layer comprising a baked in material of between 60 and 98% by weight silver or silver oxide and between 2 and 40% by weight of glass powder.

BRIEF DESCRIPTION OF THE DRAWINGS

The invention will now be described in greater detail, by way of example, with reference to the drawings, in which.

DESCRIPTION OF THE PREFERRED EMBODIMENTS

In accordance with a preferred embodiment of the invention it is proposed to form an electrically conductive contact layer from a mixture prepared in paste form with a vaporizable liquid, said mixture comprising 60 to 98% by weight of silver powder and/or silver oxide powder and 2 to 40% by weight glass powder be applied in layer form to the surface to be covered with the contact layer and then be dried and be baked in by air at 350° to 550° C.

A preferred field of application for the invention is the manufacture of gas discharge display devices and in fact for the manufacture of contact layers on such arrangements.

A substantial advantage of the method described consists in the fact that the contact layers manufactured in accordance with the invention can have a very good and air-tight adhesion to glass and ceramics surfaces. These contact layers furthermore can have very good contact and adhesion properties on electrically conductive coatings which are applied to these glass or ceramics substrates. In particular, good and air-tight adhesion is produced on the preferred tin oxide coatings.

A further advantage of the contact layers manufactured in accordance with the invention lies in the fact that even air-tight glass soldering connections may be arranged on them and that they are capable of being soldered.

Figure 1:
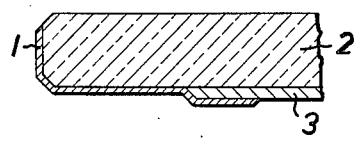
FIG. 1 is a sectional view showing the formation of an electrically conductive contact layer in accordance with the invention on an insulating and a conductive surface.

Referring now to the drawings, FIG. 1 shows a glass substrate 2 onto a surface of which is applied a conductive tin oxide layer which represents one electrode of a gas discharge display device. Overlapping with this tin oxide layer 3 is a contact layer 1 which extends to the peripheral edge of the glass substrate 2 and is manufactured in accordance with the invention.

Figure 2:
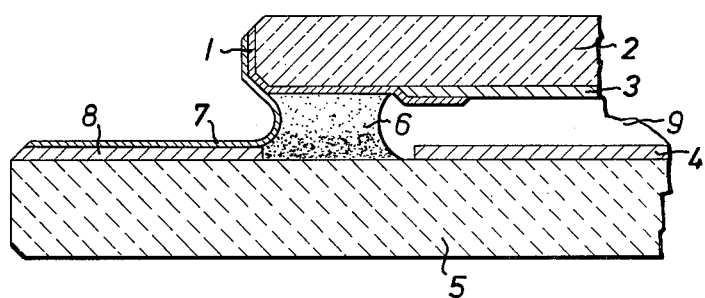
FIG. 2 is a sectional view of part of a gas discharged display device using electrically conductive contact layers in accordance with the invention.

FIG. 2 shows a gas discharge display device in cross section while using the substrate shown in FIG. 1. This device comprises a ceramics plate 5 having a cathode electrode 4. This cathode electrode 4 may comprise an electrically conductive coating or cathode material. Opposite the ceramics plate 5 is located the glass plate 2 with its anode electrode 3. The space between the two parts 2 and 5 is filled with a gas. At the periphery, this device is enclosed in air-tight manner by means of glass solder 6 and it may be seen that the glass solder is applied to the contact layer 1 and the contact layer 1 represents the external electrically conductive connection to the anode electrode 3. The cathode electrode 4 may be provided with an external contact at another point via the type of contact layer as shown in FIG. 1.

The ceramics plate 5 is larger than the glass plate 2 and has an electrically conductive contact coating 8 on its free surface lying outside the discharge chamber 9, said coating comprises, for example, a thin layer of metal. A further contact coating 7 is now provided which is manufactured in accordance with the invention and which makes an electrically conductive connection between the contact coating 1 and the contact coating 8 and passes over the glass solder 6. Thus this contact coating 7, manufactured in accordance with the invention, adheres both to the coating 1 and to the coating 8 and moreover also to the surface of the glass solder 6.

Applying such a contact coating takes place in accordance with the invention such that a paste is manufactured which contains 60 to 98% (particularly 70 to 94%) by weight of silver powder and/or silver oxide powder and 2 to 40% (particularly 6 to 30%) by weight, of glass powder. The glass powder should preferably have a melting point in the range of from 400° to 500° C. The paste type preparation takes place adviseably by mixing a bonding or thinning agent, such as anisaldehyde, methylglycolacetate, ethyl- and/or butylacetate. Preferably a fluid is used which is of organic nature and which volatilises at temperatures below 400° C. In a preferred example, a paste was used which contains 50g commercial silver or silver oxide powder and 15g glass powder. The paste type preparation was carried out with methylglycolacetate after the solid substances had been carefully ground finely in a mortar. A glass which contains 5 to 25% ZnO, 65 to 85% PbO and 5 to 25% $B_2O_3$ is preferably used as a glass powder. In a preferred example, a glass powder was used which comprised 13% ZnO, 75% PbO and 12% $B_2O_3$ "in % by weight." The grain size both of the glass powder and of the silver powder or silver oxide powder should preferably be 5 to 50µm.

The previously described paste was painted onto the surface to be contacted and dried by means of air or hot air and then baked in at temperatures of approximately 400° to 550° C. The baking in took place in a preferred time period of 10 to 20 minutes. Such a layer manufactured in accordance with the invention had an electrical resistance which was smaller than 50 Ohm/cm (particularly smaller than 30 Ohm/cm) and was used for contacting during gas discharge display.

It will be understood that the above description of the present invention is susceptible to various modification changes and adaptations.

What is claimed is:

1. In a method of forming a gas discharge display device having first and second juxtaposed spaced carriers, formed from an insulating material selected from glass, quartz or ceramic, which are connected together in an air-tight manner adjacent their periphery to define a sealed chamber therebetween and which are each provided with at least one electrode which is on a surface of same within the chamber and which is connected via a conductor to the exterior of the chamber; said method including applying an electrode as a coating of electrically conductive material on a portion of the major surface of each of said carriers which will be within the chamber, connecting a conductor to each of said electrodes, and then connecting the carriers together in an air-tight manner by means of a glass solder which likewise forms an air-tight seal with said conductor; the improvement wherein said step of connecting includes forming at least one of said conductors as a conductive layer on the surface of the associated said carrier so that it contacts a portion of said electrode and extends to a portion of the surface of said associated carrier which will be outside of said chamber by:

producing a paste like mixture of from 60 to 98% by weight of silver or silver oxide, from 2 to 40% by weight of glass powder, and an effective amount of a vaporizable liquid agent:

applying the paste in layer form to the desired portion of said carrier and of said electrode coating; and drying and baking in the paste in air at a temperature of from 350° to 550° C to cause the glass powder to fuse and form an air-tight conductor which adheres to the electrode coating material, which adheres to the material of the carrier in an air-tight manner and which forms an air-tight seal with the glass solder.

2. A method as defined in claim 1 wherein the paste like mixture has from 6 to 30% by weight of glass powder.

3. A method as defined in claim 1, wherein the paste like mixture has from 10 to 30% by weight of glass powder.

4. A method as defined in claim 1, wherein the paste is baked in with air at 400° to 550° C.

5. A method as defined in claim 4 wherein glass powder has a melting temperature of from 400° to 550° C.

6. A method as defined in claim 5 wherein said electrode is a coating of electrically conductive tin oxide and said associated carrier is glass.

7. A method as defined in claim 5 further comprising applying said paste between external contact surfaces of the gas discharge display device and then carrying out an additional said step of drying and baking in.

8. A method as defined in claim 5 wherein said mixture prepared in paste form contains 70 to 94% by weight of one or more materials selected from the group consisting of silver and silver oxide powder.

9. A method as defined in claim 5 wherein said glass powder is ground from a glass which contains substantially 5 to 25% ZnO, 65 to 85% PbO and 5 to 25% $B_2O_3$.

10. A method as defined in claim 5 wherein said glass powder is ground glass which contains substantially 10 to 15% ZnO, 70 to 80% PbO and 10 to 15% $B_2O_3$.

11. A method as defined in claim 5 wherein said glass powder and said silver or silver oxide powder both have a grain size of from 5 to 50µ.

12. A method as defined in claim 4 wherein said glass powder has a melting temperature of from 400° to 500° C.

13. A method as defined in claim 1 wherein said glass powder has a grain size of from 5 to 50µ.

14. A method as defined in claim 1 wherein said silver or silver oxide powder has a grain size of from 5 to 50µ.

* * * * *